(12) United States Patent
Hegner et al.

(10) Patent No.: US 10,150,074 B2
(45) Date of Patent: Dec. 11, 2018

(54) AIR FILTER ELEMENT AND AIR FILTER

(71) Applicant: MAHLE International GmbH, Stuttgart (DE)

(72) Inventors: Hilmar Hegner, Stuttgart (DE); Florian Klein, Bad Liebenzell (DE); Jochen Schaudt, Hechingen (DE)

(73) Assignee: MAHLE International GmbH, Stuttgart (DE)

( * ) Notice: Subject to any disclaimer, the term of this patent is extended or adjusted under 35 U.S.C. 154(b) by 153 days.

(21) Appl. No.: 15/048,095

(22) Filed: Feb. 19, 2016

(65) Prior Publication Data
US 2016/0243485 A1 Aug. 25, 2016

(30) Foreign Application Priority Data
Feb. 20, 2015 (DE) .................. 10 2015 203 138

(51) Int. Cl.
*B01D 46/00* (2006.01)
(52) U.S. Cl.
CPC ..... *B01D 46/0039* (2013.01); *B01D 46/0002* (2013.01)
(58) Field of Classification Search
CPC ........ B01D 46/0002–46/0017; B01D 46/0039; B01D 46/00–46/546; B60H 1/3227; B60H 3/06–3/0641; B60H 3/0658; B60H 2003/065; B60H 2003/0666–2003/0691; B60H 1/3233
USPC ....... 55/385.1–385.7, 495; 126/299 R–299 F
See application file for complete search history.

(56) References Cited

U.S. PATENT DOCUMENTS

| | | | |
|---|---|---|---|
| 2,697,976 A * | 12/1954 | McAlister, Jr. ...... | B60H 1/3202 261/26 |
| 4,172,709 A * | 10/1979 | Kippel .............. | A61M 16/1055 96/416 |
| 4,212,172 A * | 7/1980 | Manno ...................... | F24F 6/14 62/279 |
| 6,419,718 B1 | 7/2002 | Klug et al. | |
| 6,749,657 B2 | 6/2004 | Felber et al. | |
| 7,140,195 B1 * | 11/2006 | Fair ...................... | F24F 5/0035 62/310 |
| 2014/0260133 A1 * | 9/2014 | Von Seggern ..... | B01D 46/0031 55/418 |

FOREIGN PATENT DOCUMENTS

| | | |
|---|---|---|
| DE | 101 23 969 C1 | 11/2002 |
| DE | 101 51 620 A1 | 5/2003 |
| DE | 601 33 116 T2 | 3/2009 |
| DE | 10 2008 007 915 A1 | 8/2009 |
| DE | 10 2010 027 813 A1 | 10/2011 |
| DE | 10 2011 007 754 A1 | 10/2012 |
| EP | 2 634 023 A1 | 9/2013 |
| WO | WO 2009/087683 A2 | 7/2009 |

* cited by examiner

*Primary Examiner* — T. Bennett McKenzie
(74) *Attorney, Agent, or Firm* — Muncy, Geissler, Olds & Lowe, P.C.

(57) ABSTRACT

An air filter element with a filter cover and a filter body, whereby the filter body is connected to the filter cover with a water drainage duct, whereby the filter cover has a first side and a second side opposite to the first side, whereby the filter body is connected to the first side and the water drainage duct is connected to the second side.

9 Claims, 2 Drawing Sheets

AIR FILTER ELEMENT AND AIR FILTER

This nonprovisional application claims priority under 35 U.S.C. § 119(a) to German Patent Application No. 10 2015 203 138.1, which was filed in Germany on Feb. 20, 2015, and which is herein incorporated by reference.

BACKGROUND OF THE INVENTION

Field of the Invention

The invention relates to an air filter element, particularly for use in an air filter of a climate control system of a motor vehicle. Further, the invention relates to an air filter, particularly for use in a climate control system of a motor vehicle.

Description of the Background Art

Climate control systems are used in motor vehicles to heat and/or to cool the air to be supplied to the vehicle interior, so that it is possible to adjust an interior temperature that is pleasant for the occupants. To this end, the climate control system has a housing, the interior of which has air ducts. Air is drawn in from the environment or interior of the motor vehicle with the aid of a fan and cooled by means of an evaporator and/or heated by means of a heating element. The air in this case flows through an air filter, particularly upstream of the evaporator, and is therefore cleaned. Suitable air filter elements are, for example, particle filters, odor filters, or combinations of the two. These filter or absorb particles or odors from the air and are available in a large number of versions. The air filter elements are consumable items and, apart from the initial installation, are also routinely replaced as part of a filter service and thereby inserted in a filter housing. The removal and insertion of the air filter element should occur as easily as possible in terms of installation and without damage to the air filter element or the components surrounding it.

The construction of air filters and the materials used for the production thereof can vary, because the specific requirements imposed on them can depend on various factors such as, for example, the desired filter performance, the arising flow resistance, and the mass of the air flow.

Apart from use in climate control systems, filters are also used to filter particles out of the incoming air for internal combustion engines. Moreover, they are found in vacuum cleaners and numerous other appliances, particularly in devices whose operating method requires the supplying or discharging of air. Corresponding filters are also found in ships and submarines and in buildings, in particular in underground parts of buildings, such as cellars, garages, bunkers, and also in laboratory areas that are to be ventilated separately.

Particularly when an air filter is used to clean air drawn in from the environment of a motor vehicle, the drawn-in air can be mixed with water. The water can be, for example, rainwater, melted snow or ice, and splashing water from the roadbed over which the vehicle travels. Climate control systems in motor vehicles therefore have a water separator that is intended to prevent water from reaching the air filter due to being drawn in by the fan.

Because of structural requirements, particularly the increasingly smaller available installation space, the separated water cannot be collected for a rather long time period in the area of the air filter, but must be taken past the filter cover to a drain.

It is problematic in regard to the known prior art that a suitable water line, which goes past the filter cover, interferes with the taking off and reattaching of the filter cover and the removal and reinsertion of the air filter element for maintenance purposes. In this case, such a water line can be a hose.

This has the disadvantage, in one regard, that the hose must be attached manually in a separate work step and the material costs as well are increased by the use of multiple parts such as, for example, hose clamps.

There is the risk that this hose is bent during the removal and reinsertion of the air filter or air filter element as routinely required for maintenance purposes. The bending of the hose can lead to the hose becoming impenetrable, as a result of which the discharging of the water to be removed is hampered. In addition, there is the risk that the hose is damaged by the bending or clamping and becomes permeable as a result. In order to prevent the bending or clamping of the hose during the removal and reinsertion of the air filter or air filter element, the removal and reinsertion procedure requires a greater degree of attentiveness and takes a relatively long time.

WO 2009/087683 A2 discloses a fresh air duct for a climate control system of a motor vehicle. The fresh air duct has an inlet opening located between the windshield and the engine hood of the motor vehicle and an outlet opening connected to the fan of the climate control system. In this case, the inlet opening of the fresh air duct is smaller than the fan-side outlet opening located at the other end of the fresh air duct. The fresh air duct disposed in this manner has at its outlet opening a nylon net, which prevents insects, particles, or dust from entering the fan of the climate control system. There is an opening in the lowest region of the fresh air duct to allow rainwater to flow out of the fresh air duct. Moreover, the fresh air duct in the area of the fan-side outlet opening has two baffles which overlap in the air stream and prevent the water from passing through the net into the climate control system.

A climate control system with a two-part housing has become known from DE 10 2010 027 813 A1, whereby the housing has a condensate drain and the two housing parts are connected together by a tongue and groove connection. Condensate, forming during the operation of the climate control system by the cooling of air on the surface of a coolant evaporator, can drain off through the condensate drain.

DE 101 51 620 A1 discloses a device for climate control in a motor vehicle with a fresh air supplying device, an air filter with a filter housing and filter cover, as well as a condensate drainage chamber. The filter housing is characterized in that the condensate drainage chamber is connected integrally to the filter housing. The condensate drainage chamber in this case is designed particularly so that a hose for discharging the condensate can be plugged onto a connecting piece disposed on the condensate drainage chamber.

SUMMARY OF THE INVENTION

It is therefore an object of the invention to provide an air filter that has a structurally simple connection of the air filter element to the filter housing of the air filter and enables a simple conveying of fluids past the filter cover and, furthermore, enables easy handling of the air filter element. The object of the invention, further, is to provide an air filter whose installation and fabrication are associated with lower labor and material costs.

An exemplary embodiment of the invention provides an air filter element with a filter cover and a filter body, whereby the filter body is connected to the filter cover, with a water drainage duct, whereby the filter cover has a first side and a second side opposite to the first side, whereby the filter body is connected to the first side and the water drainage duct is connected to the second side. The air filter element with its filter cover and with the filter body therefore can be inserted advantageously into an air filter or into a filter housing of an air filter and also again removed therefrom, without this resulting in an obstruction by the device for taking the water past the filter cover.

In an exemplary embodiment, the detachable connection of the filter cover to the filter housing occurs with the aid of a plug-in connection or with the aid of a tongue and groove connection.

The air filter can have a drainage duct for discharging water particularly from an air duct leading to the air filter. Air is conveyed to the air filter by the air duct. Water, which can be, for example, rainwater, melted snow or ice, and splashing water, can accumulate in the air duct, which conveys air to the air filter. In order not to allow this water to reach the air filter, for example, the water is conveyed away with the aid of a water drainage duct. The water drainage duct ideally opens out in the flow direction of the air, flowing through the air filter, before the air filter. For this purpose, discharge openings, in which the water can flow into the water drainage duct, can be present, for example, on the housing of a climate control system, in which the air filter is operated, or on the filter cover as well. The water from the air duct, conveying the air to the air filter, can be prevented from reaching the air filter with the aid of a water rail acting as a barrier in the vicinity of the air filter. Moreover, the water rail functioning as a barrier has the effect that the water can be conveyed completely into the discharge openings, leading to the water drainage duct.

In an embodiment, the air filter cover can be made as a single piece with the water drainage duct connected to the air filter cover. This facilitates production and handling.

The filter cover and the water drainage duct connected to the filter cover includes at least partially, particularly completely, of plastic and are made as a single piece with one another by injection molding.

Another design provides that the water drainage duct and the filter cover are each formed as a single piece and are connected to one another. The connection of the water drainage duct to the filter cover is made particularly by a plug-in, welded, or adhesive connection. Easy installation can be achieved thereby.

In an embodiment, the filter cover defines a plane, whereby the water drainage duct formed as a single piece with or connected to the filter cover is arranged parallel thereto.

In an embodiment, the filter cover defines a plane, whereby the water drainage duct formed as a single piece with or connected to the filter cover is arranged inclined thereto. Inclined means, for example, that the water drainage duct protrudes from the plane defined by the filter cover at an angle of 5°, 10°, or 20° or more.

An exemplary embodiment of the invention provides an air filter with an air filter element and a filter housing, whereby the filter housing has an opening and the air filter element is inserted or can be inserted through the opening into the filter housing, whereby the filter cover closes the opening.

The air filter can have at least one water drainage duct connected to the filter housing. A simple space-saving design is created in this way.

The filter housing and/or the water drainage duct connected to the filter housing can be formed, at least partially, particularly completely, of plastic and are made as a single piece with one another by injection molding.

Another embodiment provides that the filter housing side connected to the water drainage duct defines a plane, whereby the water drainage duct connected to the filter housing is arranged parallel thereto.

Another embodiment provides that the filter housing side connected to the water drainage duct defines a plane, whereby the water drainage duct connected to the filter housing is arranged inclined thereto.

In an embodiment, the water drainage duct, on the side of the air filter cover, is connected to the filter-housing-side water drainage duct, formed at least on one side. In this case, the connection of the air-filter-cover-side water drainage duct to the at least one filter-housing-side water drainage duct occurs such that both water drainage ducts form a continuous water drainage duct. As a result, the water drainage duct is automatically closed upon the insertion of the air filter element.

In another embodiment, the filter housing has two filter-housing-side water drainage ducts, whereby the filter-cover-side water drainage duct is connected to the two filter-housing-side water drainage ducts and is disposed between them.

In this case, the connection of the air-filter-cover-side water drainage duct to the two filter-housing-side water drainage ducts occurs such that both water drainage ducts form a continuous water drainage duct.

Another embodiment provides that the filter cover and the filter housing side connected to the two filter-housing-side water drainage ducts define a mutual plane to which the two water drainage ducts, connected to the filter housing, and the filter-cover-side water drainage duct, connected to the two filter-housing-side water drainage ducts, are arranged parallel or inclined.

In an embodiment, the water drainage ducts can be connected to have open ends that are beveled complementary to one another. A simple connection can be realized in this way.

The air filter can be integrated into a vehicle climate control system, which has a fan and/or a heating element and/or a coolant evaporator and/or optionally a condensate drain for conveying the condensate away from the coolant evaporator, and the water drainage ducts, connected on the filter housing side and filter cover side, open into the condensate drain.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
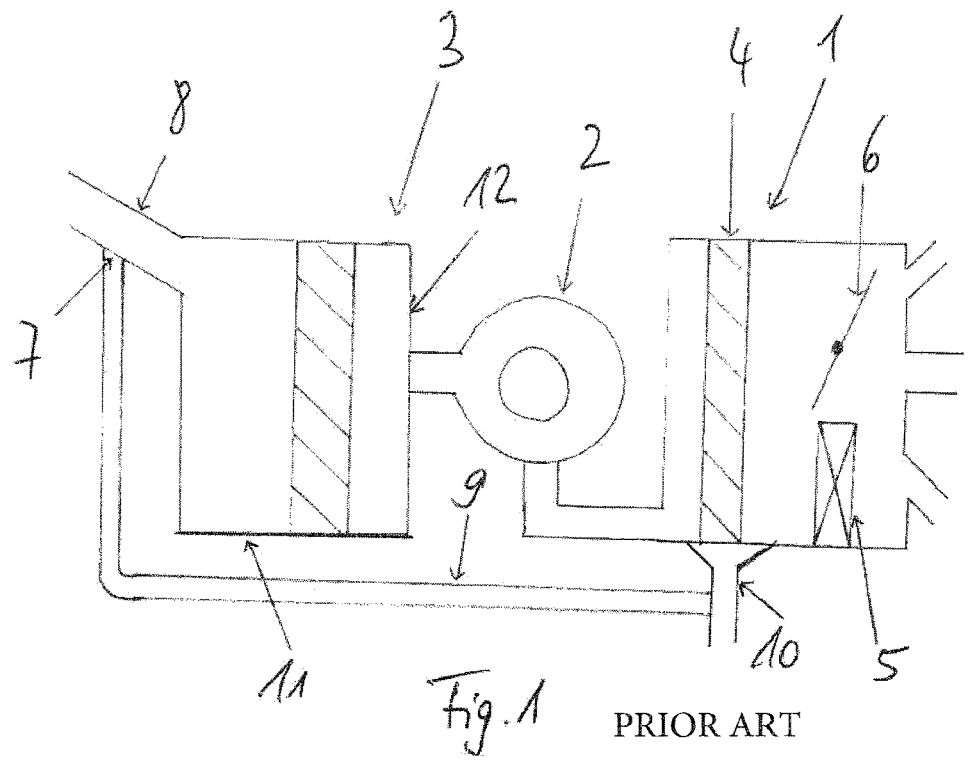
FIG. 1 shows a schematic illustration of a vehicle climate control system.

FIG. 1 shows the schematic structure of a climate control system 1 of a vehicle according to the prior art. Climate control system 1 has a housing made of plastic. A fan 2, an air filter 3, a coolant evaporator 4 for cooling the air, and a heating element 5 for heating the air are customarily disposed in the interior of the housing.

The housing in this case delimits air ducts, not shown in greater detail, for conveying air. A fresh air/recirculating air flap 6 controls whether air is drawn in by the fan from the environment of the vehicle or from the vehicle interior. For example, the drawn-in air, particularly the air draw in from the outside from the environment of the vehicle, is separated from water with the aid of a water separator (not shown). In order to prevent the separated water from remaining in air supply duct 8 and from there reaching air filter 3, it is advantageous to convey the water, separated from the air supply, away from the housing (not shown in greater detail) of climate control system 1. The water separated from the air drawn in from the outside is conveyed for this purpose, for example, through an opening 7 in air supply duct 8 via a hose connection 9 into condensate drain 10 of coolant evaporator 4.

A filter cover 11 is connected to filter housing 12 below air filter 3. Filter cover 11 can be removed from the air filter housing in order to replace the air filter for maintenance purposes. To this end, the filter cover is connected vertically to the air filter housing below the air filter.

Figure 2:
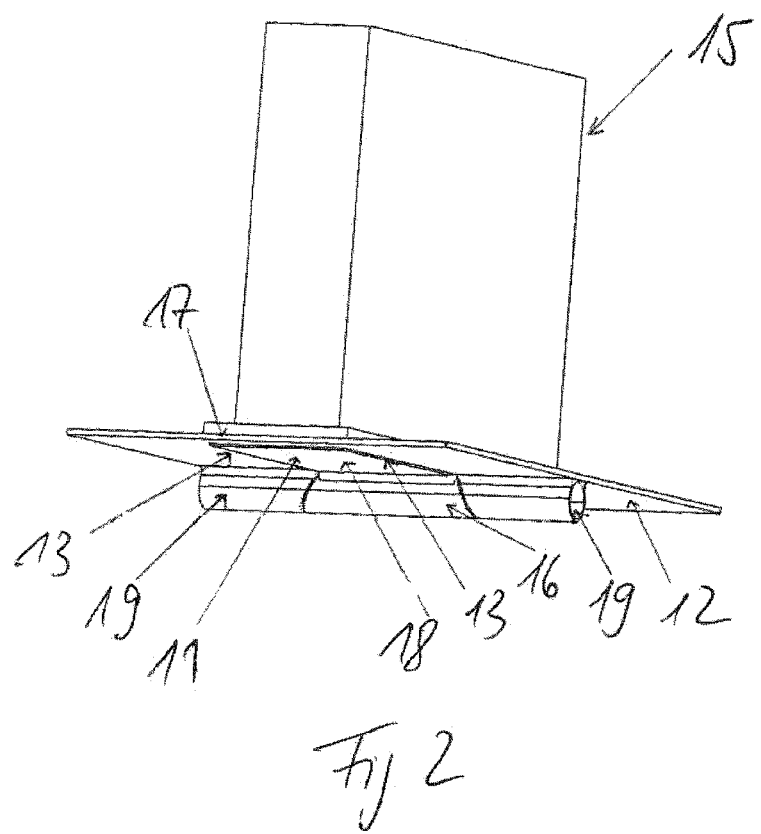
FIG. 2 shows a perspective and partial view of an air filter element inserted in a filter housing.

An exemplary embodiment of an air filter element 14 of the invention, inserted in opening 13 provided in filter housing 12, is shown in FIG. 2.

Air filter element shown in FIG. 2 has a filter body 15, which is designed rectangular, for example. In other embodiments, however, filter body 15 can also be formed cubic, cylindrical, balloon-shaped, spherical, or irregular in shape. Filter body 15 is fabricated partially or completely of paper and/or plastic. In other embodiments, filter body 15 can also be formed of partially or completely or in addition of sheet metal, textile fabrics, composites, light metal compounds, or carbon fibers.

Air filter element 14 shown in FIG. 2 has in addition a filter cover 11, connected to filter body 15, with a water drainage duct 16, whereby filter cover 11 has a first side 17 and a second side 18 opposite to first side 17, whereby filter body 15 is connected to first side 17 and water drainage duct 16 is connected to second side 18.

Filter cover 11 shown in FIG. 2 has a rectangular shape. In other embodiments, filter cover 11 can be formed round, particularly circular or oval, as well as square or irregular. Filter cover 11 is fabricated partially or completely of plastic. In other embodiments, filter cover 11 can be formed, partially or completely of sheet metal, textile fabrics, composites, light metal compounds, or carbon fibers.

Water drainage duct 16 shown in FIG. 2 is connected to second side 18 of filter cover 11 and in this exemplary embodiment is made as a uniform hollow cylinder. In other embodiments, the outer shape of water drainage duct 16 can vary and have a structural form that changes in the longitudinal direction.

Figure 3:
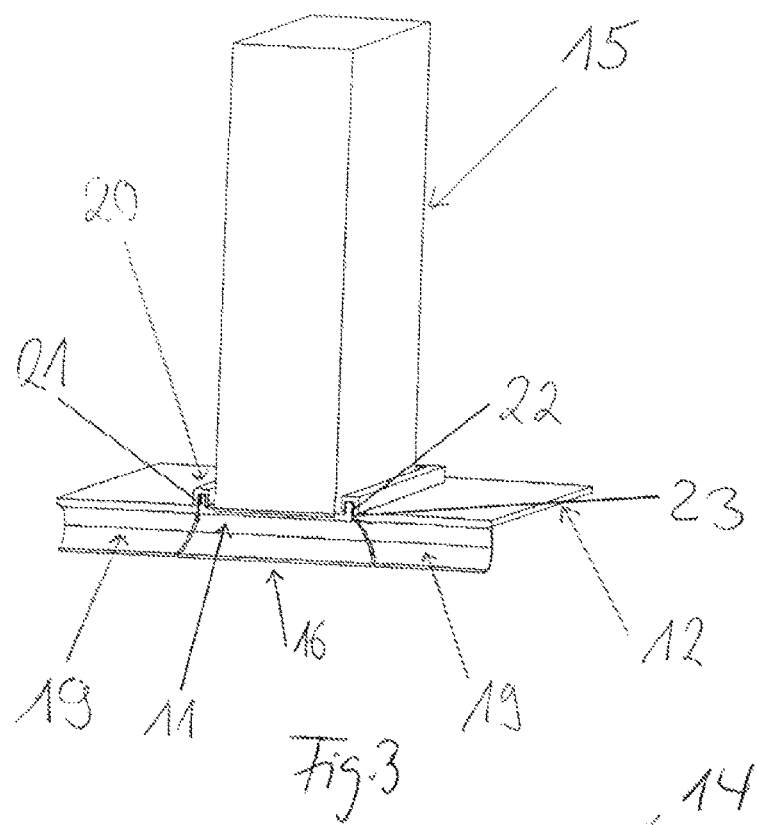
FIG. 3 shows a sectional view through an air filter element, inserted in the filter housing, and the interconnected filter-cover-side and filter-housing-side water drainage ducts.
Figure 4:
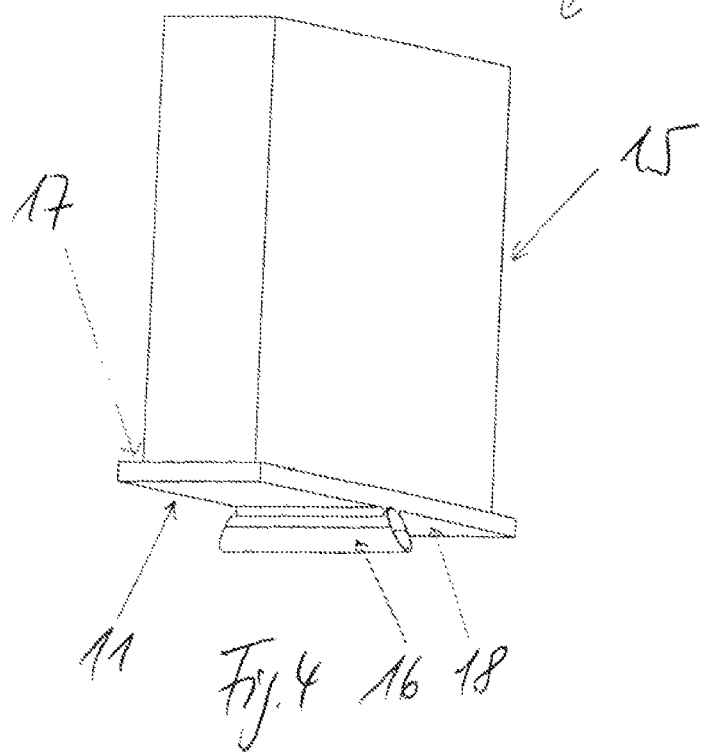
FIG. 4 shows a perspective view of an air filter element with a filter cover and filter-cover-side water drainage duct.

The inner cross section of water drainage duct 16 is shown in a round embodiment in FIG. 3 and FIG. 4. In other realizations, the inner cross section of filter-cover-side water drainage duct 16 can also vary and in the longitudinal direction have sections with a differently formed cross section. In a particular embodiment, water drainage duct 16 contains passive flow elements that facilitate the draining off of the water.

In an especially advantageous embodiment of filter element 14, shown in FIG. 2, water drainage duct 16 is formed as a single piece with filter cover 11. In particular, water drainage duct 16 and filter cover 11 can be made as a single piece by injection molding.

In another embodiment of air filter element 14, shown in FIG. 2, water drainage duct 16 and filter cover 11 are each made as a single piece and connected together.

Air filter element 14 shown in FIG. 2 has a filter cover 11, defining a plane to which water drainage duct 16 is arranged parallel below filter cover 11. In a particular embodiment, water drainage duct 16 is arranged parallel to this plane above filter cover 11. In another embodiment, water drainage duct 16 is arranged inclined to this plane below filter cover 11. In an alternative exemplary embodiment, water drainage duct 16 is arranged inclined to this plane or parallel to this plane above filter cover 11.

Air filter element 14 shown in FIG. 2 is inserted in filter housing 12 of an air filter, not illustrated further. Filter housing 12 has an opening 13 for inserting air filter element 14. Filter cover 11 closes opening 13 by the insertion of air filter element 14 in opening 13. FIG. 2 shows air filter element 14 inserted in filter housing 12 so that filter cover 11 and opening 13 are located in the filter housing below filter body 15. In another embodiment, opening 13 in filter housing 12 and filter cover 11, closing opening 13 in filter housing 12, are located to the side of filter body 15 or above filter body 15.

Air filter element 14 shown in FIG. 2 is inserted in a filter housing 12, whereby filter housing 12 has two water drainage ducts 19 connected to filter housing 12. Water drainage ducts 19, shown in FIG. 2 and connected to filter housing 12, are made as uniform hollow cylinders. In other embodiments, the outer shape of water drainage ducts 19, connected to filter housing 12, can vary and have a structural form changing in the longitudinal direction.

The inner cross section of water drainage ducts 19 connected to filter housing 12 is shown with a round cross section in FIG. 2 and FIG. 3. The cross-sectional form of water drainage ducts 19 connected to filter housing 12 can also vary and in the longitudinal direction have sections with a differently formed cross section. In a particular embodiment, water drainage ducts 19 connected to filter housing 12 contain passive flow elements that facilitate the draining off of the water.

In an especially advantageous embodiment, water drainage ducts 19 connected to filter housing 12 are formed as a single piece with filter housing 12. In particular, water drainage ducts 19, connected to filter housing 12, and filter housing 12 are formed as a single piece by injection molding.

In a particular embodiment, filter housing 12 has only one water drainage duct 19 connected to filter housing 12. In an especially advantageous embodiment, water drainage duct 19, connected to filter housing 12, is formed as a single piece with filter housing 12. In particular, water drainage duct 19, connected to filter housing 12, and filter housing 12 can be made as a single piece by injection molding.

Air filter element 14 shown in FIG. 2 is inserted in a filter housing 12, whereby filter housing 12 has two water drainage ducts 19, connected to filter housing 12 and connected to filter-cover-side water drainage duct 16. A closed water drainage duct, which goes past the filter cover, is formed by the connection of water drainage ducts 19, connected to filter housing 12, and filter-cover-side water drainage duct 16. Foam rings, for example, can be attached as a seal on the open ends of water drainage ducts 19, connected to filter housing 12, and the open ends of filter-cover-side water drainage duct 16.

The exemplary embodiment shown in FIG. 2 has two filter-housing-side water drainage ducts 19 and a filter-cover-side water drainage duct 16, which are arranged so that filter-cover-side water drainage duct 16 is disposed between filter-housing-side water drainage ducts 19, particularly if air filter element 14 is inserted in opening 13 in filter housing 12 and filter cover 11 closes opening 13 in filter housing 12.

In the exemplary embodiment shown in FIG. 2 and in FIG. 3, the open ends of water drainage ducts 19, connected to filter housing 12, and of filter-cover-side water drainage duct 16 are beveled complementary to one another at an angle of 90°, 60°, 45°, 20°, or 5° to the longitudinal axis of the interconnected water drainage ducts.

In an especially advantageous embodiment, the connection of the complementarily beveled open ends occurs, for example, via a non-threaded connecting device, for example, a plug-in connection and/or via complementary engagement structures and/or a Hirth joint, whereby the connection occurs particularly by a relative movement of filter cover 11 occurring vertically, substantially to the longitudinal axis of water drainage duct 19, connected to filter housing 12, and of filter-cover-side water drainage duct 16.

In another exemplary embodiment, the open ends can have at least one lip seal, whereby the at least one lip seal is made particularly as a radial sealing lip. Alternatively, the open ends can also have, for example, compression seals or other seals, particularly other seals customary for pipe joints.

FIG. 3 shows an exemplary embodiment of the device of the invention in which filter cover 11 is connected via a connection 20 with a labyrinth seal to filter housing 12. Connection 20 is particularly suitable to prevent water or air from passing through a joint located between filter cover 11 and filter housing 12.

In an advantageous embodiment, connection 20 with a labyrinth seal has at least one recess or groove 21 formed by filter housing 12. When opening 13 in the filter housing is closed by filter cover 11, a projection 22, formed on filter cover 11, engages in the at least one recess or groove 21, whereby a labyrinth gap 23 arises between a wall formed by the recess or groove 21, and a wall formed by projection 22 on filter cover 11.

Alternatively, labyrinth gap 23 can be closed by the application of foam profiles and/or silicone profiles, elastic sealing lips with hollow profiles, and/or other sealing profiles on the wall, formed by the at least one recess or groove 21, and/or on the wall, formed by projection 22 on filter cover 11.

What is claimed is:

1. An air filter element comprising:
    a filter cover;
    a filter body connected to the filter cover; and
    a water drainage duct, the water drainage duct being a hollow tube,
    wherein the filter cover is a planar element having a first surface and a second surface that opposes the first surface,
    wherein the filter body is connected to the first surface of the filter cover and the water drainage duct is connected to the second surface of the filter cover, such that an axial direction of the hollow tube extends parallel to a plane defined by the second surface of the filter cover,
    wherein the water drainage duct and the filter cover are monolithic, such that the water drainage duct is made as a single piece with the filter cover, and
    wherein the filter body is insertable through an opening of a filter housing to extend into the filter housing and the filter cover having a same shape as the opening of the filter housing, such that when the filter body extends into the filter housing, the filter cover closes the opening so that the second surface of the filter cover aligns with an exterior surface of the filter housing, and
    wherein, out of the first surface and the second surface of the filter cover, the water drainage duct is directly connected solely to the second surface of the filter cover and, out of the first surface and the second surface of the filter cover, the filter body is directly connected solely to the first surface of the filter cover.

2. An air filter comprising:
    a filter housing; and
    an air filter element according to claim 1,
    wherein the filter housing has an opening and the filter body is inserted through the opening to extend into the filter housing,
    wherein the filter cover has a same shape as the opening of the filter housing, such that when the filter body extends into the filter housing, the filter cover closes the opening so that the second surface of the filter cover aligns with an exterior surface of the filter housing, such that the second surface of the filter cover and the exterior surface of the filter housing extend in a same plane.

3. The air filter according to claim 2, wherein at least one additional water drainage duct is provided, and wherein the at least one additional water drainage duct is directly connected to the filter housing.

4. The air filter according to claim 3, wherein the at least one additional water drainage duct is made as a single piece with the filter housing by injection molding.

5. The air filter according to claim 3, wherein the water drainage duct is connected to the at least one additional water drainage duct.

6. The air filter according to claim 5, comprising two of the at least one additional water drainage ducts, such that two additional water drainage ducts are provided, and wherein the water drainage duct is connected to the two additional water drainage ducts and is disposed between the two additional water drainage ducts.

7. The air filter according to claim 5, wherein the water drainage duct and the at least one additional water drainage duct each have open ends that are to be connected, and wherein the open ends are beveled complementary to one another.

8. The air filter according to claim 3, wherein the at least one additional water drainage duct is connected to the filter housing on the exterior surface of the filter housing.

9. The air filter according to claim 8, wherein when the filter cover closes the opening of the filter housing, an open end of the water drainage duct aligns with and directly connects to an open end of the at least one additional water drainage duct.

* * * * *